(12) United States Patent
Shimizu

(10) Patent No.: US 11,693,108 B2
(45) Date of Patent: Jul. 4, 2023

(54) MOVING OBJECT DETECTION APPARATUS

(71) Applicant: DENSO CORPORATION, Kariya (JP)

(72) Inventor: Naotsugu Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 346 days.

(21) Appl. No.: 17/151,487

(22) Filed: Jan. 18, 2021

(65) Prior Publication Data
US 2021/0165091 A1 Jun. 3, 2021

Related U.S. Application Data

(63) Continuation of application No. PCT/JP2019/028112, filed on Jul. 17, 2019.

(30) Foreign Application Priority Data

Jul. 20, 2018 (JP) .................................. 2018-136958

(51) Int. Cl.
*G01S 13/66* (2006.01)
*G01S 13/931* (2020.01)

(52) U.S. Cl.
CPC ............ *G01S 13/66* (2013.01); *G01S 13/931* (2013.01)

(58) Field of Classification Search
CPC .......... G01S 7/292; G01S 7/2927; G01S 7/41; G01S 7/415; G01S 13/58; G01S 13/584; G01S 13/66; G01S 13/931
See application file for complete search history.

(56) References Cited

U.S. PATENT DOCUMENTS

2003/0201878 A1* 10/2003 Bai ........................ G01S 13/931
342/70
2003/0218564 A1* 11/2003 Tamatsu ................ G01S 13/931
342/107

(Continued)

FOREIGN PATENT DOCUMENTS

JP   H05-341038 A    12/1993
JP   2004-220341 A    8/2004

(Continued)

OTHER PUBLICATIONS

U.S. Appl. No. 17/151,490 and its entire file history, filed Jan. 18, 2021, Shimizu.

*Primary Examiner* — Peter M Bythrow
(74) *Attorney, Agent, or Firm* — Maschoff Brennan

(57) ABSTRACT

A moving object detection apparatus repeatedly acquires, from a radar apparatus, observed-point information indicating observed-point positions that are positions of observed points where radar waves are reflected. The apparatus estimates, based on the observed-point positions indicated respectively by a plurality of pieces of the observed-point information and tracking filter coefficients indicating the degree of tracking the observed-point positions, a tracking trajectory tracking movement of a moving object corresponding to a plurality of the observed points. The apparatus determines whether distribution of the plurality of the observed points on both sides of the tracking trajectory is continuously biased to one side of the tracking trajectory. The apparatus sets the tracking filter coefficients so that the tracking degree is higher when the distribution of the plurality of the observed points is determined to be biased than when the distribution of the plurality of the observed points is determined to be not biased.

6 Claims, 10 Drawing Sheets

(56) References Cited

U.S. PATENT DOCUMENTS

| | | | |
|---|---|---|---|
| 2011/0006941 A1* | 1/2011 | Samukawa | G01S 13/931 342/123 |
| 2011/0221628 A1* | 9/2011 | Kamo | G01S 7/295 342/123 |
| 2011/0285574 A1* | 11/2011 | Tsunekawa | G01S 7/40 342/107 |
| 2015/0293216 A1* | 10/2015 | O'Dea | B60W 40/06 701/23 |
| 2016/0103218 A1* | 4/2016 | Mandava | B60Q 5/006 701/301 |
| 2017/0345312 A1* | 11/2017 | Shimizu | B60R 21/00 |
| 2017/0363738 A1* | 12/2017 | Kaino | G01S 13/584 |
| 2021/0405175 A1* | 12/2021 | Miyahara | G01S 13/44 |

FOREIGN PATENT DOCUMENTS

| | | |
|---|---|---|
| JP | 2006-275828 A | 10/2006 |
| JP | 2013-61214 A | 4/2013 |

\* cited by examiner

MOVING OBJECT DETECTION APPARATUS

CROSS-REFERENCE TO RELATED APPLICATIONS

The present application is a continuation application of International Application No. PCT/JP2019/028276 filed on Jul. 18, 2019, which is based on and claims priority from Japanese Patent Application No. 2018-136959 filed on Jul. 20, 2018. The contents of these applications are hereby incorporated by reference in their entirety into the present application.

BACKGROUND

1 Technical Field

The present disclosure relates to moving object detection apparatuses that detect moving objects existing around a vehicle.

2 Description of Related Art

There is disclosed, for example in Japanese Patent Application Publication No. JP 2011-232818 A, a moving object detection apparatus that detects moving objects existing around an own vehicle by emitting radar waves as transmitted waves over a predetermined angle around the vehicle and receiving reflected waves.

SUMMARY

According to the present disclosure, there is provided a moving object detection apparatus which includes a position information acquisition unit, a trajectory estimation unit, a bias determination unit and a filter setting unit.

The position information acquisition unit is configured to repeatedly acquire, from a radar apparatus that is mounted to a vehicle to transmit and receive radar waves, observed-point position information indicating observed-point positions that are positions of observed points where the radar waves are reflected.

The trajectory estimation unit is configured to estimate, based on the observed-point positions indicated by a plurality of pieces of the observed-point position information acquired by the position information acquisition unit respectively at different time instants and tracking filter coefficients indicating the degree of tracking (or following) the observed-point positions, a tracking trajectory tracking movement of a moving object corresponding to a plurality of the observed points.

The bias determination unit is configured to determine whether distribution of the plurality of the observed points on both sides of the tracking trajectory is continuously biased to one side of the tracking trajectory.

The filter setting unit is configured to set the tracking filter coefficients so that the degree of tracking is higher when the distribution of the plurality of the observed points is determined by the bias determination unit to be biased than when the distribution of the plurality of the observed points is determined by the bias determination unit to be not biased.

DESCRIPTION OF EMBODIMENTS

In a radar apparatus that detects objects in a wide detection angle, under the influence of the surrounding environment (e.g., roadside objects, nearby vehicles, a road surface and the like), variation occurs in the positions of observed points where the radar waves are reflected. In this regard, by adapting tracking filter coefficients to the stable side, it is possible to suppress variation in a tracking trajectory tracking the movement of a moving object detected by the radar apparatus. However, the inventor of the present application has found, through detailed investigation, that: when the own vehicle travels through a curve or either the own vehicle or the moving object makes a lane change, a rapid position change occurs in the vehicle width direction in the results of detecting the position of the moving object by the radar apparatus, thereby causing deterioration in the responsiveness to the actual positions of the moving object in the tracking trajectory of the moving object.

In contrast, the above-described moving object detection apparatus according to the present disclosure can set the tracking filter coefficients so that the degree of tracking is low when the distribution of the plurality of the observed points is not biased and high when the distribution of the plurality of the observed points is biased. Consequently, when no rapid position change occurs in the width direction of the vehicle in the results of detecting the position of the moving object by the radar apparatus, the moving object detection apparatus can suppress variation in the tracking trajectory due to variation in the positions of the observed points. Otherwise, when a rapid position change occurs in the width direction of the vehicle in the results of detecting the position of the moving object by the radar apparatus, the moving object detection apparatus can improve the responsiveness to the actual positions of the moving object in the tracking trajectory of the moving object.

An embodiment of the present disclosure will be described hereinafter with reference to the drawings.

Figure 1:
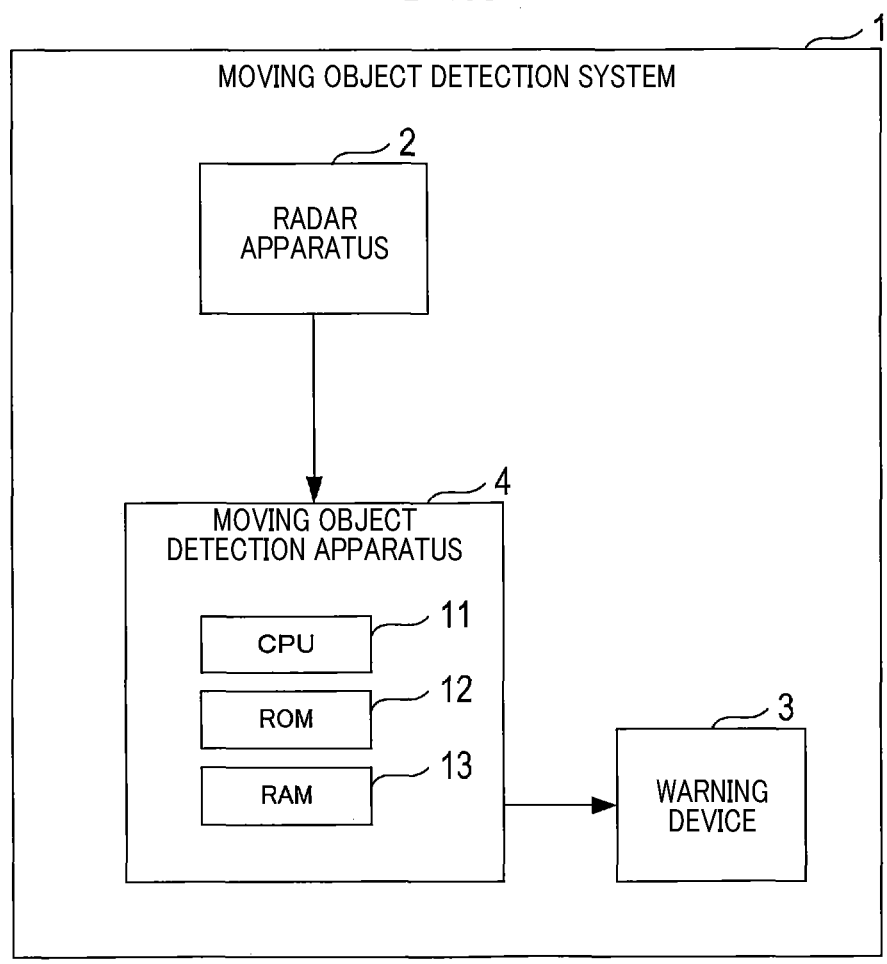
FIG. 1 is a block diagram illustrating the configuration of a moving object detection system.

A moving object detection system 1 according to the present embodiment is mounted to a vehicle. As shown in FIG. 1, the moving object detection system 1 includes a radar apparatus 2, a warning device 3 and a moving object detection apparatus 4.

Figure 2:
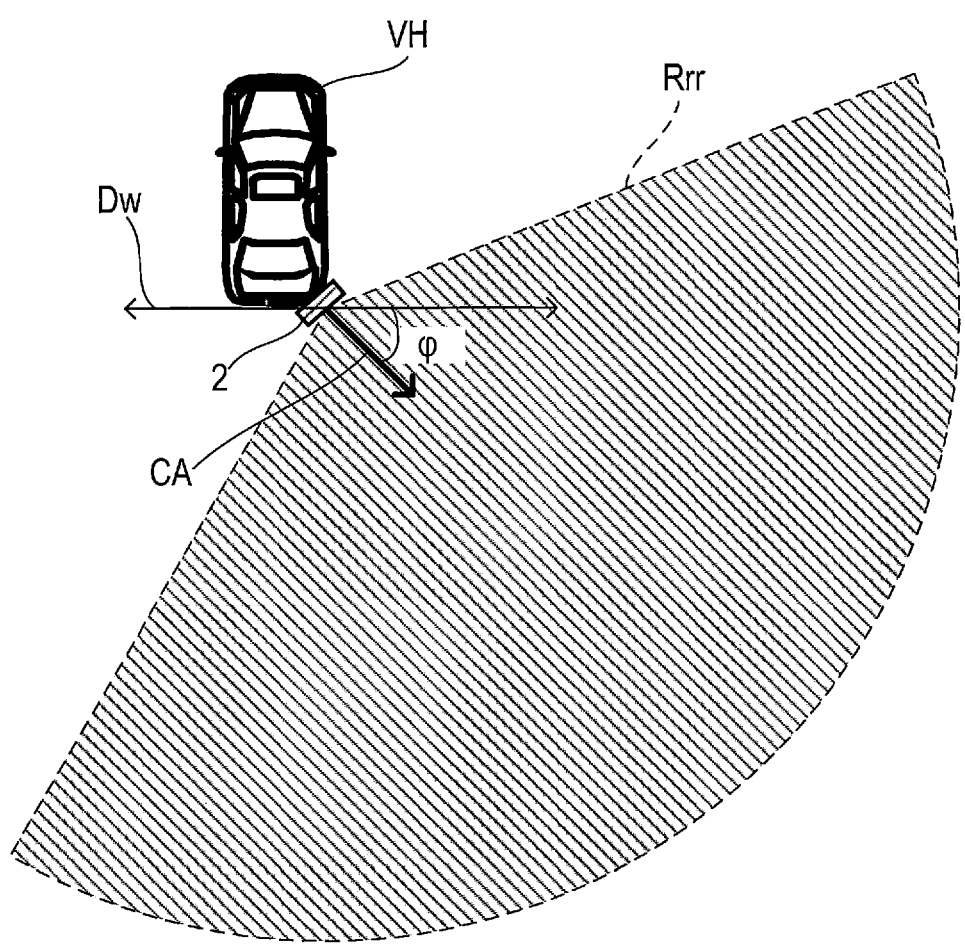
FIG. 2 is a diagram illustrating the installation position of a radar apparatus and an object detection region.

As shown in FIG. 2, the radar apparatus 2 is installed in a right-rear part of the vehicle VH to which the moving object detection system 1 is mounted. The radar apparatus 2 detects moving objects (e.g., automobiles and motorcycles)

existing in an object detection region Rrr by transmitting radar waves to a right side behind the vehicle VH.

The radar apparatus 2 is installed such that a central axis CA of a detection range of a receiving antenna is oriented in a direction inclined by an installation angle φ backward with respect to a width direction DW of the vehicle VH. The detection range is set to include, for example, a range of ±80° with the central axis CA being its center.

The radar apparatus 2 uses a well-known FMCW method. The radar apparatus 2 transmits radar waves of upward modulation intervals and radar waves of downward modulation intervals alternately at a preset modulation period, and receives the reflected radar waves. In addition, FMCW is an abbreviation of Frequency Modulated Continuous Wave. The radar apparatus 2 detects, for each modulation cycle, the distances to points where the radar waves are reflected (hereinafter, to be referred to as observed points), the relative speeds between it and the observed points and the azimuths of the observed points. In addition, the azimuths are horizontal angles with respect to the central axis CA.

Moreover, the radar apparatus 2 outputs observed-point information, which indicates the detected distances, relative speeds and azimuths of the observed points, to the moving object detection apparatus 4.

The warning device 3 is an audio output device installed in the vehicle compartment. The warning device 3 is configured to output a warning sound to occupants of the vehicle.

As shown in FIG. 1, the moving object detection apparatus 4 is an electronic control apparatus which is configured mainly with a microcomputer of a well-known type; the microcomputer includes a CPU 11, a ROM 12 and a RAM 13. Various functions of the microcomputer are realized by execution of programs by the CPU 11; the programs are stored in a non-transitory tangible storage medium. In this example, the ROM 12 is the non-transitory tangible storage medium in which the programs are stored. Moreover, methods corresponding to the programs are also realized by execution of the programs. In addition, some or all of the functions performed by the CPU 11 may alternatively be realized by hardware such as one or more ICs. Furthermore, the moving object detection apparatus 4 may be configured with either a single microcomputer or a plurality of microcomputers.

Next, steps of a rear-approach warning process performed by the CPU 11 of the moving object detection apparatus 4 will be described. During operation of the moving object detection apparatus 4, the rear-approach warning process is repeated each time one modulation period elapses.

Figure 3:
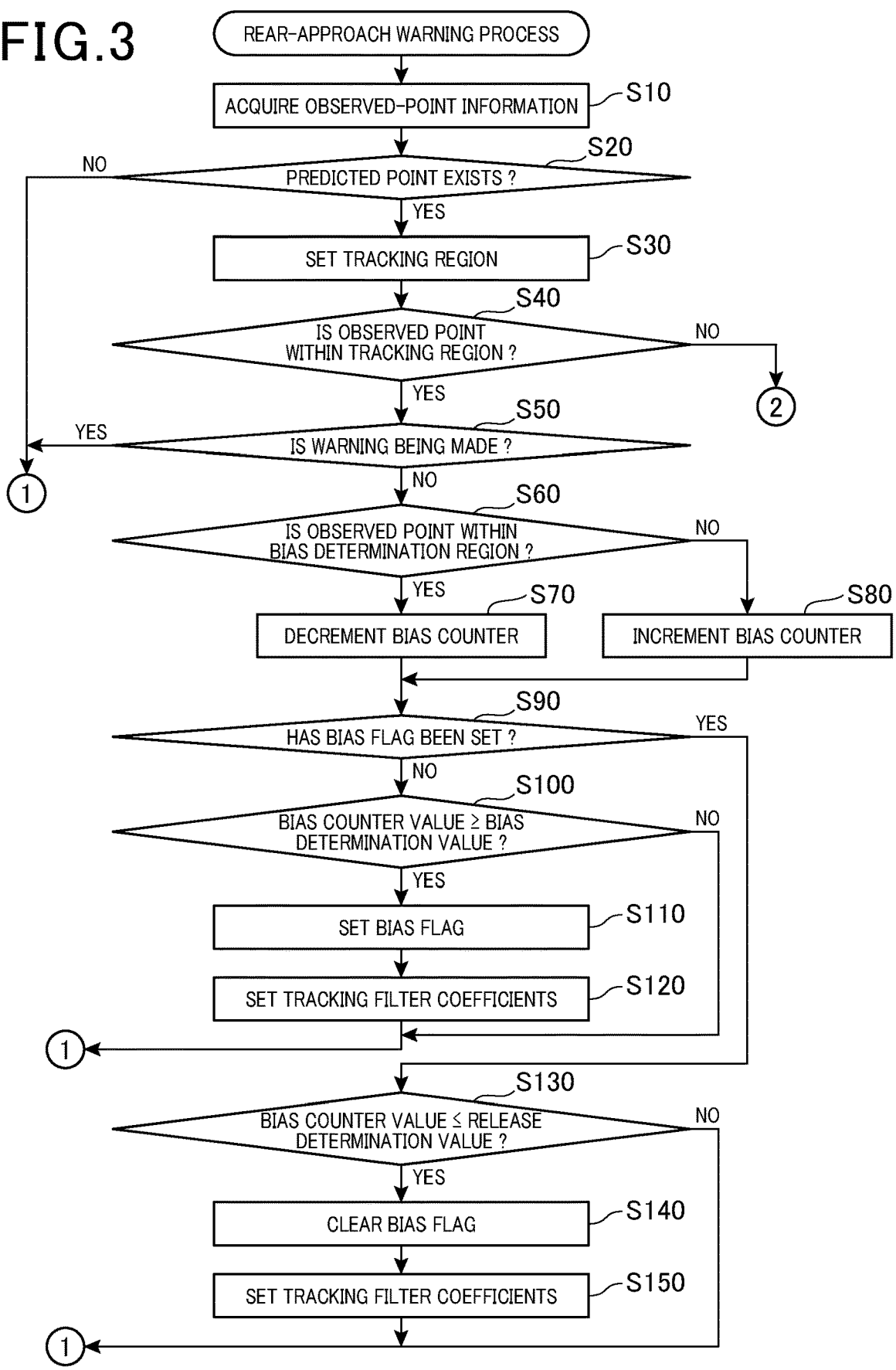
FIG. 3 is a flow chart illustrating a first half section of a rear-approach warning process.

As shown in FIG. 3, upon start of the rear-approach warning process, first in step S10, the CPU 11 acquires the observed-point information from the radar apparatus 2. Then, in step S20, the CPU 11 determines whether there exists a predicted point calculated in a previous cycle of the rear-approach warning process. In addition, predicted points are calculated in step S210 to be described later.

Figure 5:
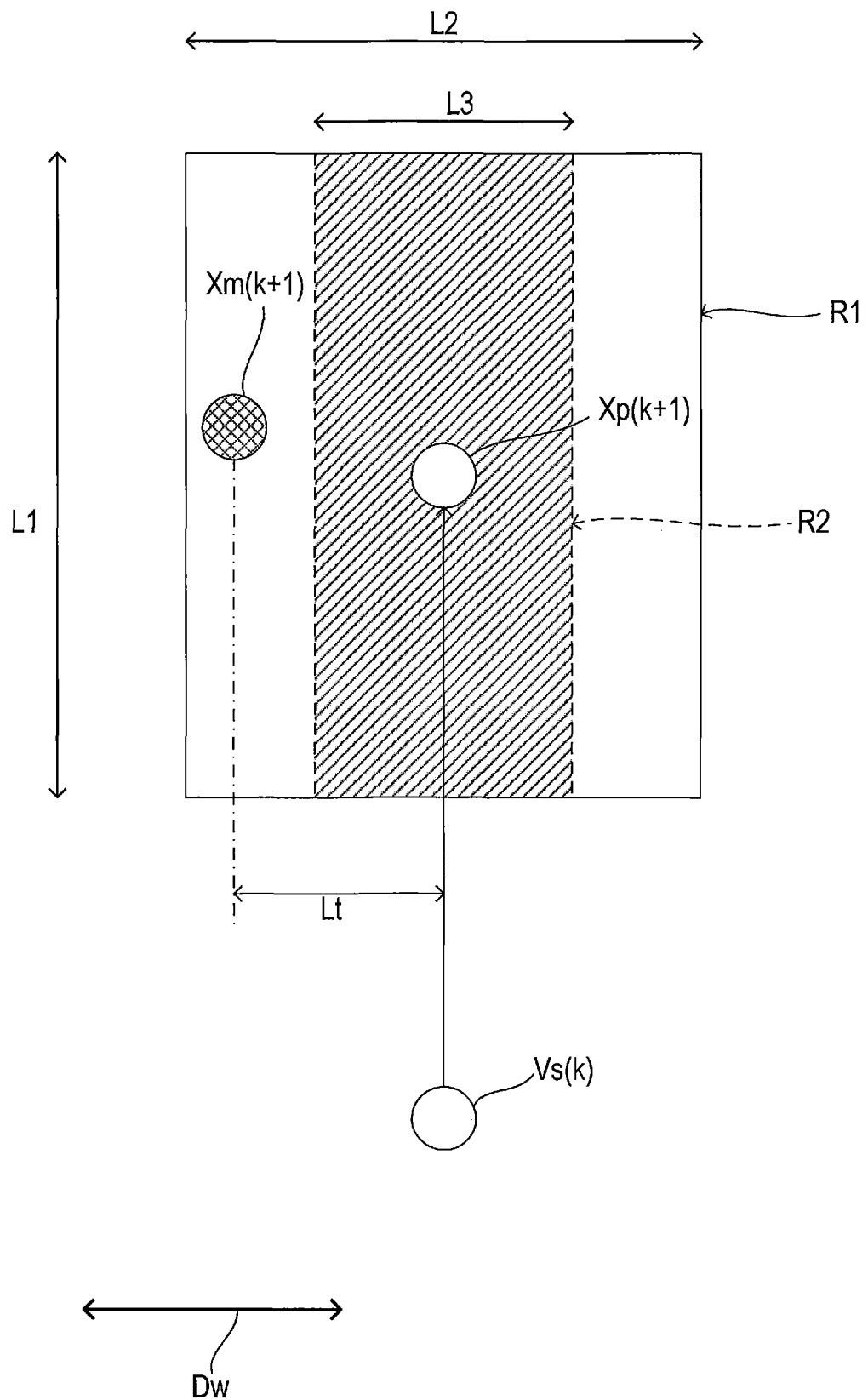
FIG. 5 is a diagram illustrating a tracking region and a bias determination region.

If there is no predicted point, the CPU 11 advances the rear-approach warning process to step S200. On the other hand, if there is a predicted point, then in step S30, the CPU 11 sets a tracking region. Specifically, as shown in FIG. 5, the CPU 11 sets a rectangular region as a tracking region R1; the rectangular region has its center at a predicted-point position $Xp(k+1)$ calculated in later-described step S210 in the rear-approach warning process performed before one modulation period, a preset longitudinal length L1 in a front-rear direction of the vehicle VH, and a preset lateral length L2 in the width direction DW of the vehicle VH. In the present embodiment, the longitudinal length L1 is preset to, for example, 6m and the lateral length L2 is preset to, for example, 4m.

Upon completion of step S30, in step S40 as shown in FIG. 3, the CPU 11 determines whether the position of an observed point (hereinafter, to be referred to as the current observed-point position), which is identified by the distance and azimuth indicated by the observed-point information acquired in step S10, is within the tracking region set in step S30. If the current observed-point position is within the tracking region, then in step S50, the CPU 11 further determines whether a warning is being made by the warning device 3. Moreover, if a warning is being made by the warning device 3, the CPU 11 advances the rear-approach warning process to step S200. On the other hand, if no warning is being made by the warning device 3, then in step S60, the CPU 11 determines whether the current observed-point position is within a bias determination region. As shown in FIG. 5, the bias determination region is a rectangular region R2 that has its center at the predicted-point position $Xp(k+1)$, the longitudinal length L1 in the front-rear direction of the vehicle VH, and a lateral length L3 in the width direction DW of the vehicle VH; the lateral length L3 is set to be shorter than the lateral length L2. In addition, the lateral length L3 is set by referring to a lateral length map. The lateral length map is set to have a positive correlation between the distance between the predicted-point position $Xp(k+1)$ and a smoothed position $Xs(k)$ to be described later and the lateral length L3. It should be noted that the expression of "having a positive correlation between the distance and the lateral length L3" encompasses both the case of the lateral length L3 increasing in steps with increase in the distance and the case of the lateral length L3 increasing continuously with increase in the distance.

If the current observed-point position is within the bias determination region, then in step S70 as shown in FIG. 3, the CPU 11 decrements (i.e., subtracts 1 from) a bias counter stored in the RAM 13. Thereafter, the CPU 11 advances the rear-approach warning process to step S90. On the other hand, if the current observed-point position is outside the bias determination region, then in step S80, the CPU 11 increments (i.e., adds 1 to) the bias counter. Thereafter, the CPU 11 advances the rear-approach warning process to step S90. In addition, an upper limit of the bias counter is, for example 10 and a lower limit of the bias counter is, for example, 0.

In step S90, the CPU 11 determines whether a bias flag has been set in the RAM 13. Moreover, if the bias flag has been cleared, then in step S100, the CPU 11 further determines whether the value of the bias counter (hereinafter, to be referred to as the bias counter value) is greater than or equal to a preset bias determination value (e.g., 5 in the present embodiment). If the bias counter value is less than the bias determination value, the CPU 11 advances the rear-approach warning process to step S200. On the other hand, if the bias counter value is greater than or equal to the bias determination value, then in step S110, the CPU 11 sets the bias flag. Further, in step S120, the CPU 11 sets tracking filter coefficients α and β be described later. Specifically, the CPU 11 sets the tracking filter coefficient α by referring to a first map for use when distribution of the observed points is biased. Moreover, the CPU 11 sets the tracking filter coefficient β by referring to a second map for use when distribution of the observed points is biased. Thereafter, the CPU 11 advances the rear-approach warning process to step S200.

The first and second maps for use when distribution of the observed points is biased are set to have a positive correlation between the distance indicated by the observed-point information acquired in step S10 and the tracking filter coefficients α and β. Moreover, the first and second maps for use when distribution of the observed points is biased are set to also have a positive correlation between a lateral distance Lt and the tracking filter coefficients α and β As shown in FIG. 5, the lateral distance Lt represents the difference in the width direction Dw of the vehicle VH between the predicted-point position Xp calculated in later-described step S210 in the rear-approach warning process performed before one modulation period and the observed-point position Xm identified by the observed-point information acquired in step S10; the observed-point position Xm will be described later. It should be noted that the expression of "having a positive correlation between the distance and the tracking filter coefficients" encompasses both the case of the tracking filter coefficients increasing in steps with increase in the distance and the case of the tracking filter coefficients increasing continuously with increase in the distance.

If it is determined in step S90 that the bias flag has been set, then in step S130, the CPU 11 further determines whether the bias counter value is less than or equal to a preset release determination value (e.g., 3 in the present embodiment). Moreover, if the bias counter value is determined to be greater than the release determination value, the CPU 11 advances the rear-approach warning process to step S200. On the other hand, if the bias counter value is determined to be less than or equal to the release determination value, then in step S140, the CPU 11 clears the bias flag. Further, in step S150, the CPU 11 sets the tracking filter coefficients α and β. Specifically, the CPU 11 sets the tracking filter coefficient α by referring to a first map for use when distribution of the observed points is normal; the first map specifies the correspondence between the distance indicated by the observed-point information acquired in step S10 and the tracking filter coefficient α. Moreover, the CPU 11 sets the tracking filter coefficient β by referring to a second map for use when distribution of the observed points is normal; the second map specifies the correspondence between the distance indicated by the observed-point information acquired in step S10 and the tracking filter coefficient β. Thereafter, the CPU 11 advances the rear-approach warning process to step S200. The first and second maps for use when distribution of the observed points is normal are set to have a positive correlation between the distance and the tracking filter coefficients α and β. Moreover, when compared at the same distance, the tracking filter coefficient α set by the first map for use when distribution of the observed points is normal is less than the tracking filter coefficient α set by the first map for use when distribution of the observed points is biased. Similarly, when compared at the same distance, the tracking filter coefficient β set by the second map for use when distribution of the observed points is normal is less than the tracking filter coefficient β set by the second map for use when distribution of the observed points is biased.

Figure 4:
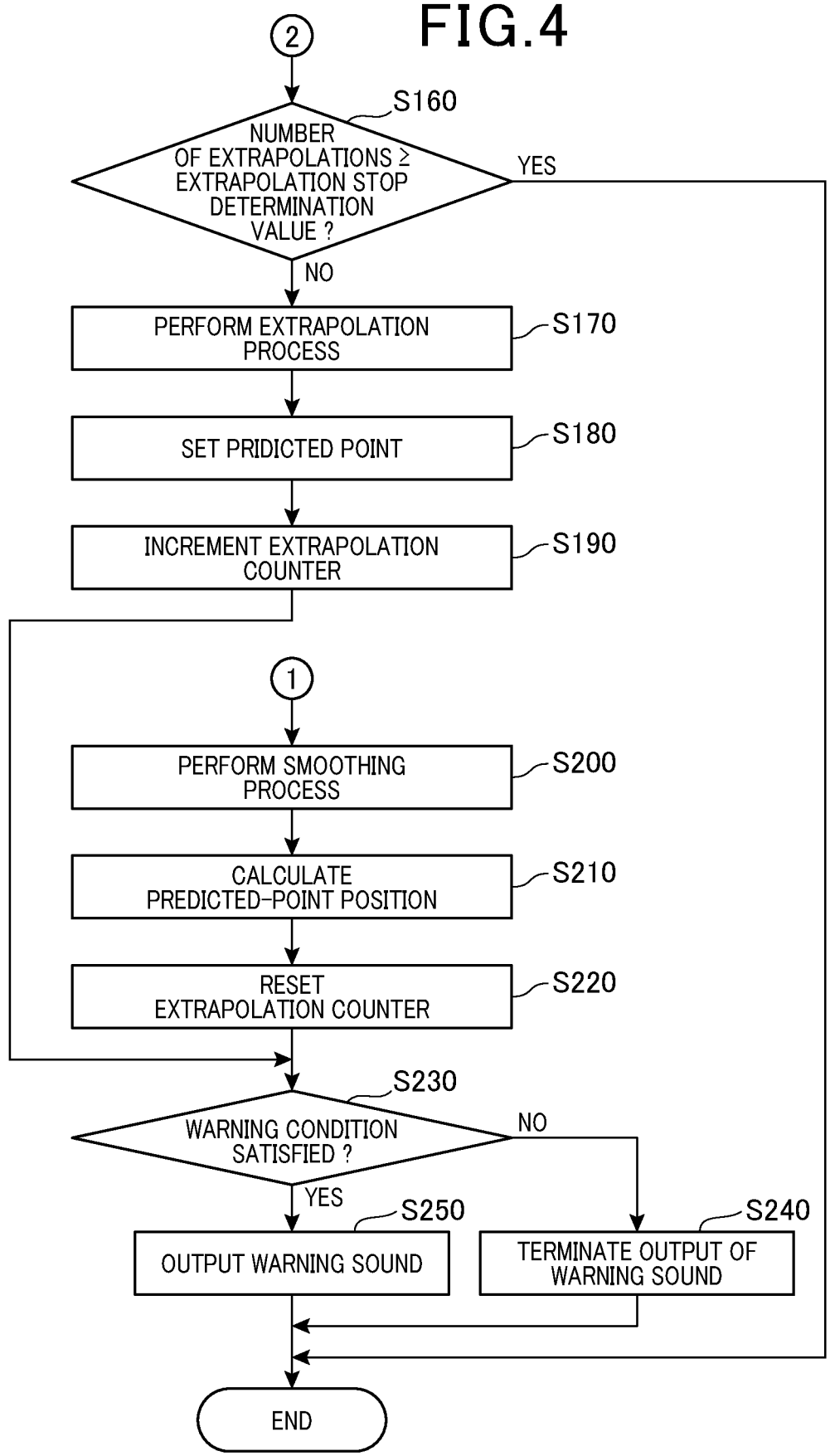
FIG. 4 is a flow chart illustrating a second half section of the rear-approach warning process.

As shown in FIG. 4, in step S200, the CPU 11 performs a smoothing process. In the present embodiment, the CPU 11 performs a well-known α-β filter process as the smoothing process. Specifically, the CPU 11 calculates the smoothed position Xs(k) and the smoothed velocity Vs(k) by the following Equations (1) and (2). The detection timing indicator k represents integers greater than or equal to 0, which respectively indicate detection timings of a plurality of observed points corresponding to the same object detected by the radar apparatus 2. That is, the detection timing indicator k of the observed point, which is detected earliest among the plurality of observed points corresponding to the same object, is 0. The earlier the detection timings of the observed points, the smaller values of the detection timing indicator k are assigned to the observed points. Hereinafter, Xs(k) will be referred to as the kth smoothed position and Vs(k) will be referred to as the kth smoothed velocity.

$$Xs(k)=Xp(k)+\alpha\{Xm(k)-Xp(k)\} \quad (1)$$

$$Vs(k)=Vs(k-1)+(\beta/T)\{Xm(k)-Xp(k)\} \quad (2)$$

T in Equation (2) is the modulation period. Both α in Equation (1) and β in Equation (2) are the tracking filter coefficients. Xm(k) in both Equations (1) and (2) is the position of the kth observed point. Xm(k) is calculated based on the distance and azimuth indicated by the observed-point information acquired in step S10.

Xp(k) in both Equations (1) and (2) is the position of the kth predicted point. Xp(k) is calculated by the following Equation (3) in later-described step S210 in the rear-approach warning process performed before one modulation period.

Next, in step S210, the CPU 11 calculates the predicted-point position Xp(K+1) by the following Equation (3).

$$Xp(K+1)=Xs(k)+T\times Vs(k) \quad (3)$$

Further, in step S220, the CPU 11 resets (i.e., sets to 0) an extrapolation counter stored in the RAM 13. Thereafter, the CPU 11 advances the rear-approach warning process to step S230.

Moreover, if the current observed-point position is determined in step S40 to be outside the tracking region, then in step S160, the CPU 11 determines whether the value of the extrapolation counter (hereinafter, to be referred to as the number of extrapolations) is greater than or equal to a preset extrapolation stop determination value (e.g., 5 in the present embodiment). If the number of extrapolations is determined to be greater than or equal to the extrapolation stop determination value, the CPU 11 terminates the rear-approach warning process.

On the other hand, if the number of extrapolations is determined to be less than the extrapolation stop determination value, then in step S170, the CPU 11 performs an extrapolation process. Specifically, the CPU 11 updates the latest smoothed position to a position that is obtained by moving the latest smoothed position at the latest smoothed velocity for one modulation period.

Further, in step S180, the CPU 11 sets the latest predicted-point position to a position that is obtained by moving the latest smoothed position, which has been updated in step S170, at the latest smoothed velocity for one modulation period. Then, the CPU 11 increments the extrapolation counter in step S190. Thereafter, the CPU 11 advances the rear-approach warning process to step S230.

In step S230, the CPU 11 determines whether a preset warning condition is satisfied. In the present embodiment, the warning condition is preset such that all of the following first, second and third conditions are satisfied. The first condition is that the smoothed position is on the rear side of the vehicle VH. The second condition is that the smoothed position is within a lane adjacent to and rightward of the lane on which the vehicle VH is traveling. The third condition is that a predicted time to collision TTC, which is calculated based on both the distance between the vehicle VH and the smoothed position and the smoothed velocity, is shorter than or equal to a preset warning determination time (e.g., 2s in the present embodiment). In addition, TTC is an abbreviation of Time To Collision.

If the warning condition is not satisfied, then in step S240, the CPU 11 terminates the output of the warning sound from the warning device 3. Consequently, when the warning device 3 is outputting the warning sound, the output of the warning sound is interrupted; otherwise, when the warning device 3 is not outputting the warning sound, the state of the warning device 3 not outputting the warning sound is maintained. Thereafter, the CPU 11 terminates the rear-approach warning process.

On the other hand, if the warning condition is satisfied, then in step S250, the CPU 11 causes the warning device 3 to output the warning sound. Consequently, when the warning device 3 is outputting the warning sound, the state of the warning device 3 outputting the warning sound is maintained; otherwise, when the warning device 3 is not outputting the warning sound, the output of the warning sound is started. Thereafter, the CPU 11 terminates the rear-approach warning process.

The moving object detection apparatus 4 configured as described above repeatedly acquires, from the radar apparatus 2 that is mounted to the vehicle VH to transmit and receive radar waves, the observed-point information indicating the observed-point positions that are the positions of the observed points where the radar waves are reflected.

The moving object detection apparatus 4 estimates, based on the observed-point positions indicated by a plurality of pieces of the observed-point information acquired respectively at different time instants and the tracking filter coefficients α and β indicating the degree of tracking (or following) the observed-point positions, a tracking trajectory tracking the movement of a moving object corresponding to a plurality of the observed points.

The moving object detection apparatus 4 determines whether distribution of the plurality of the observed points on both sides of the tracking trajectory is continuously biased to one side of the tracking trajectory.

The moving object detection apparatus 4 sets the tracking filter coefficients α and β so that the degree of tracking is higher when the distribution of the plurality of the observed points is determined to be biased than when the distribution of the plurality of the observed points is determined to be not biased.

As above, the moving object detection apparatus 4 can set the tracking filter coefficients α and β so that the degree of tracking is low when the distribution of the plurality of the observed points is not biased and high when the distribution of the plurality of the observed points is biased. Consequently, when no rapid position change occurs in the width direction Dw of the vehicle VH in the results of detecting the position of the moving object by the radar apparatus 2, the moving object detection apparatus 4 can suppress variation in the tracking trajectory due to variation in the positions of the observed points. Otherwise, when a rapid position change occurs in the width direction Dw of the vehicle VH in the results of detecting the position of the moving object by the radar apparatus 2, the moving object detection apparatus 4 can improve the responsiveness to the actual positions of the moving object in the tracking trajectory of the moving object.

Figure 6:
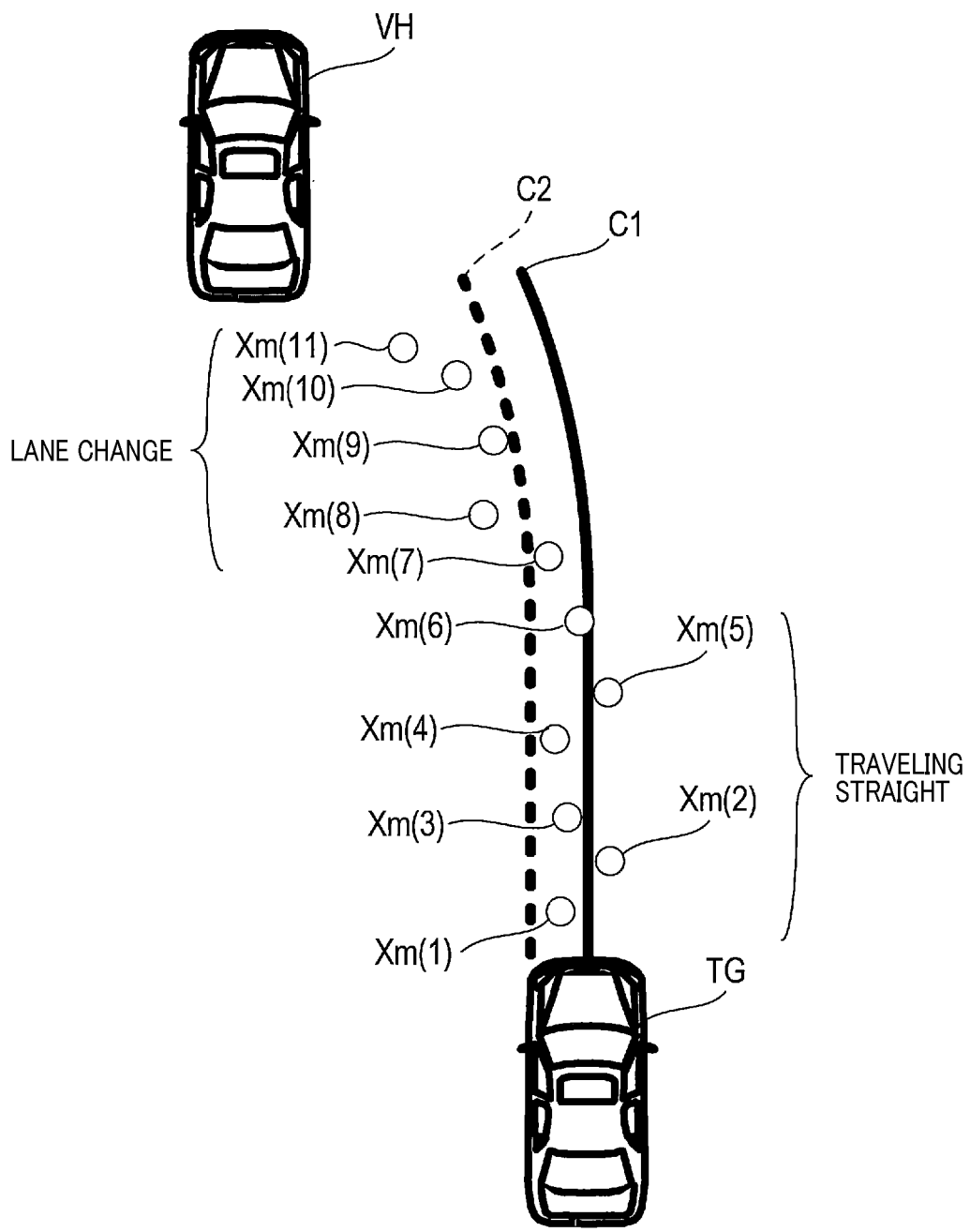
FIG. 6 is a diagram illustrating a specific example of a bias determination.

In FIG. 6, the curve C1 depicted as a continuous line is obtained by connecting a plurality of smoothed positions that are calculated by detecting a moving object TG, which is approaching the vehicle VH from the right-rear side of the vehicle VH, by the radar apparatus 2. The curve C2 depicted as a dashed line represents the left boundary of a bias determination region centering on the curve C1.

For example, when the moving object TG travels straight, the observed points are within the bias determination region, as shown by the observed-point positions Xm(1), Xm(2), Xm(3), Xm(4), Xm(5) and Xm(6). Moreover, after a lane change is made by the moving object TG to the left side, though the observed-point position Xm(7) is still within the bias determination region, the subsequent observed-point positions Xm(8), Xm(9), Xm(10) and Xm(11) are outside the bias determination region. Consequently, the bias counter value will become greater than or equal to the bias determination value, causing the bias flag to be set.

Figure 7:
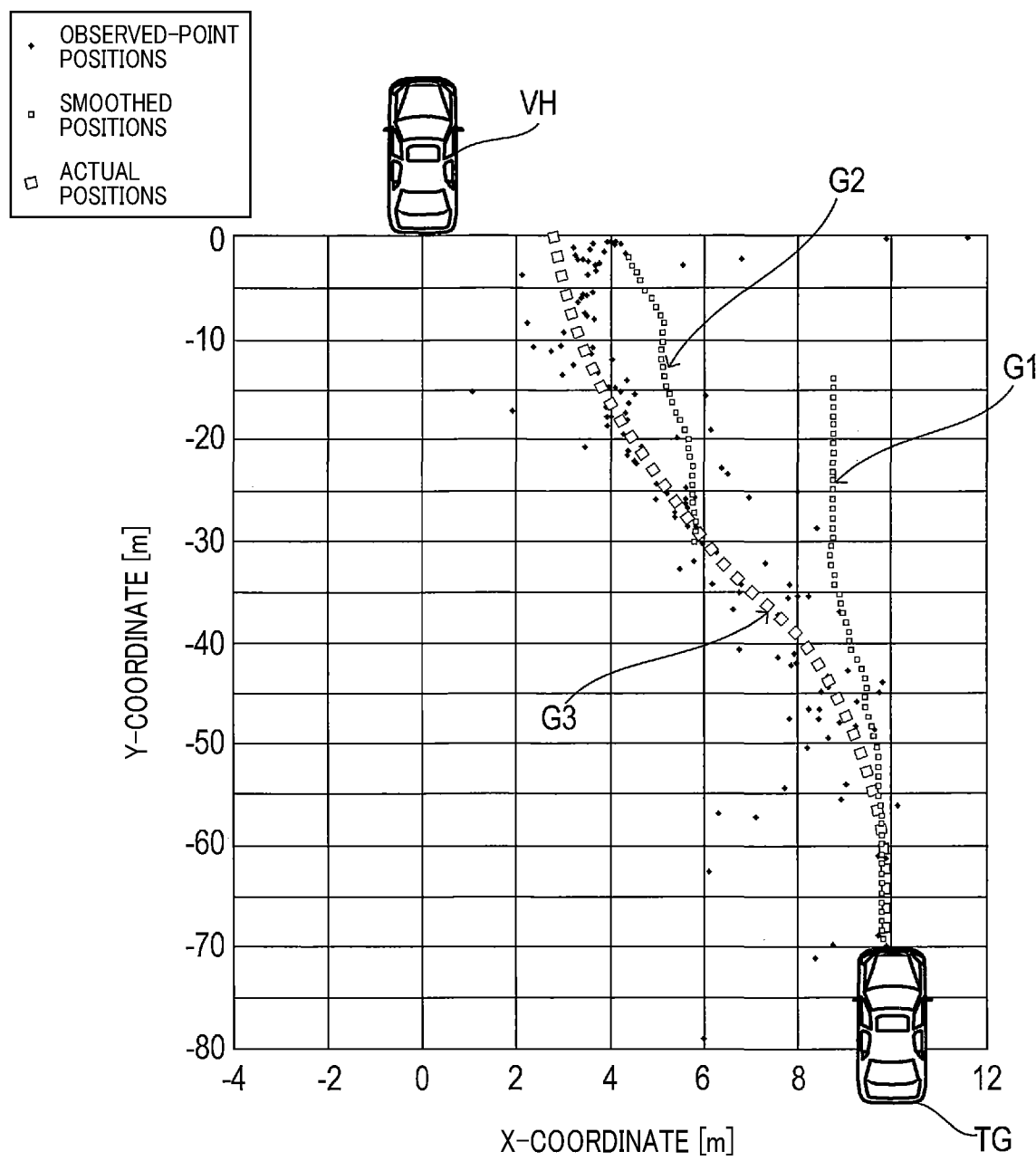
FIG. 7 is a diagram illustrating a discontinuity in the trajectory of smoothed positions.

FIG. 7 shows the distribution of the observed-point positions and the smoothed positions in the case of detecting a moving object TG, which is approaching the vehicle VH from the right-rear side of the vehicle VH, with a moving object detection apparatus that does not use the method of setting the tracking filter coefficients according to the present disclosure. The point groups G1 and G2 in FIG. 7 represent the trajectory of the smoothed positions (i.e., the tracking trajectory). The point group G3 in FIG. 7 represents the trajectory of the actual positions of the moving object TG.

As shown in FIG. 7, under the influence of roadside objects and the like, there is variation in the observed-point positions of the moving object TG. In this regard, the tracking filter coefficients are adapted to the stable side, thereby suppressing the leftward/rightward variation in the trajectory of the smoothed positions of the moving object TG. However, upon the behavior of the moving object TG being changed by a lane change or the like, the tracking performance of the smoothed positions to the actual positions of the moving object TG is deteriorated, causing a discontinuity to occur in the trajectory of the smoothed positions as shown by the point groups G1 and G2.

Figure 8:
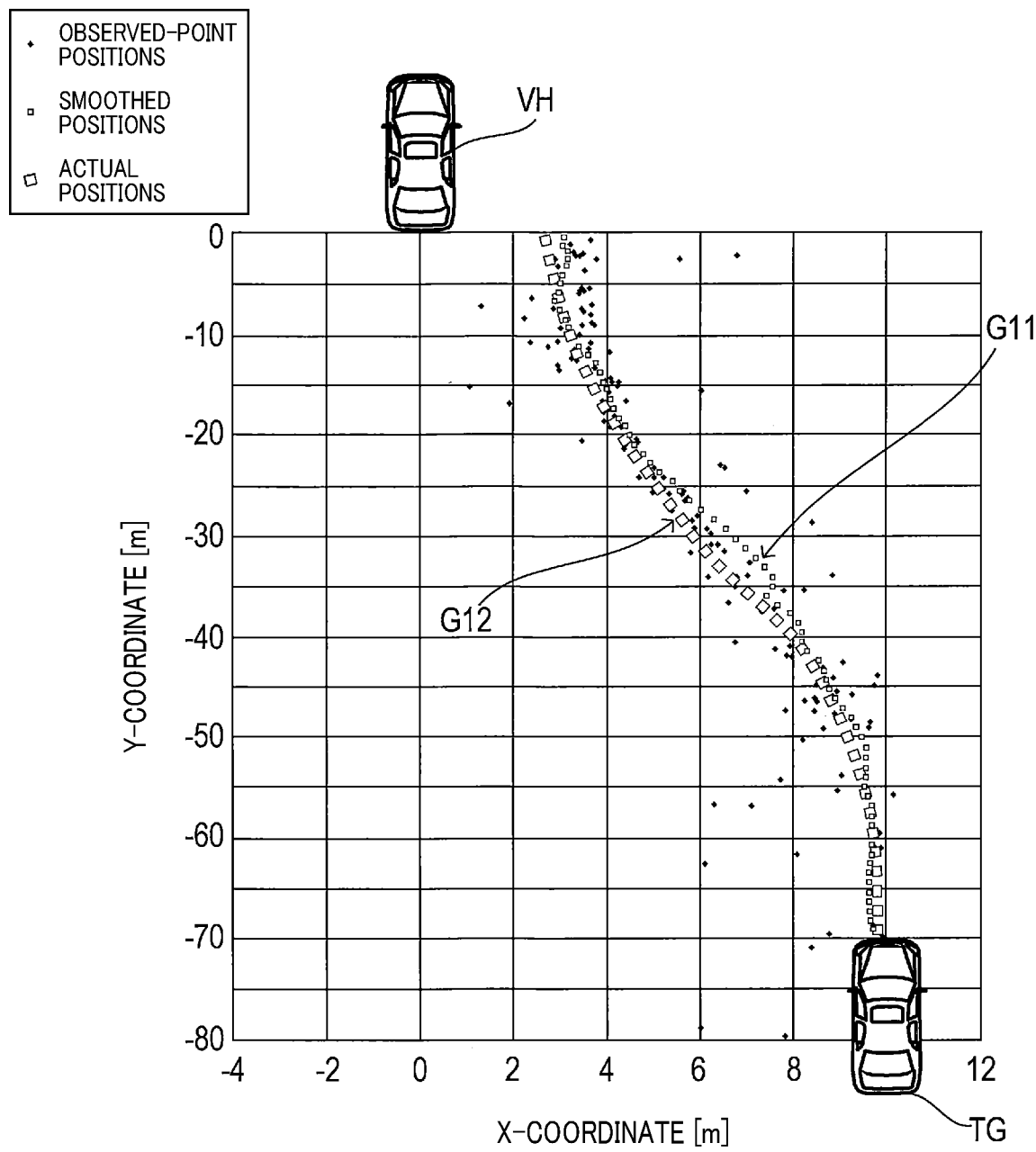
FIG. 8 is a diagram illustrating elimination of the discontinuity in the trajectory of smoothed positions.

In contrast, FIG. 8 shows the distribution of the observed-point positions and the smoothed positions in the case of detecting a moving object TG, which is approaching the vehicle VH from the right-rear side of the vehicle VH, with the moving object detection apparatus 4 according to the present disclosure. The point group G11 in FIG. 8 represents the trajectory of the smoothed positions (i.e., the tracking trajectory). The point group G12 in FIG. 8 represents the trajectory of the actual positions of the moving object TG.

As shown in FIG. 8, under the influence of roadside objects and the like, there is variation in the observed-point positions of the moving object TG. In this regard, by adapting the tracking filter coefficients to the tracking side when the behavior of the moving object TG is changed by a lane change or the like, it becomes possible to improve the tracking performance of the smoothed positions to the actual positions of the moving object TG and eliminate any discontinuity in the trajectory of the smoothed positions.

The moving object detection apparatus 4 sets the tracking filter coefficients α and β so as to have a positive correlation between the lateral distance Lt and the tracking filter coefficients α and β. Consequently, the moving object detection apparatus 4 can improve the responsiveness to the actual positions of the moving object in the tracking trajectory of the moving object even when the bias of the observed-point positions with respect to the tracking trajectory is large.

The moving object detection apparatus 4 determines whether the moving object is approaching the vehicle VH along an adjacent lane that is adjacent to the vehicle VH. Moreover, when the moving object is determined to be approaching the vehicle VH along the adjacent lane, the moving object detection apparatus 4 inhibits the setting of the tracking filter coefficients α and β performed so as to increase the degree of tracking. Consequently, the moving object detection apparatus 4 can suppress the occurrence of a situation where the moving object is erroneously determined to be not approaching the vehicle VH along the adjacent lane though it is actually approaching the vehicle VH along the adjacent lane.

Figure 9:
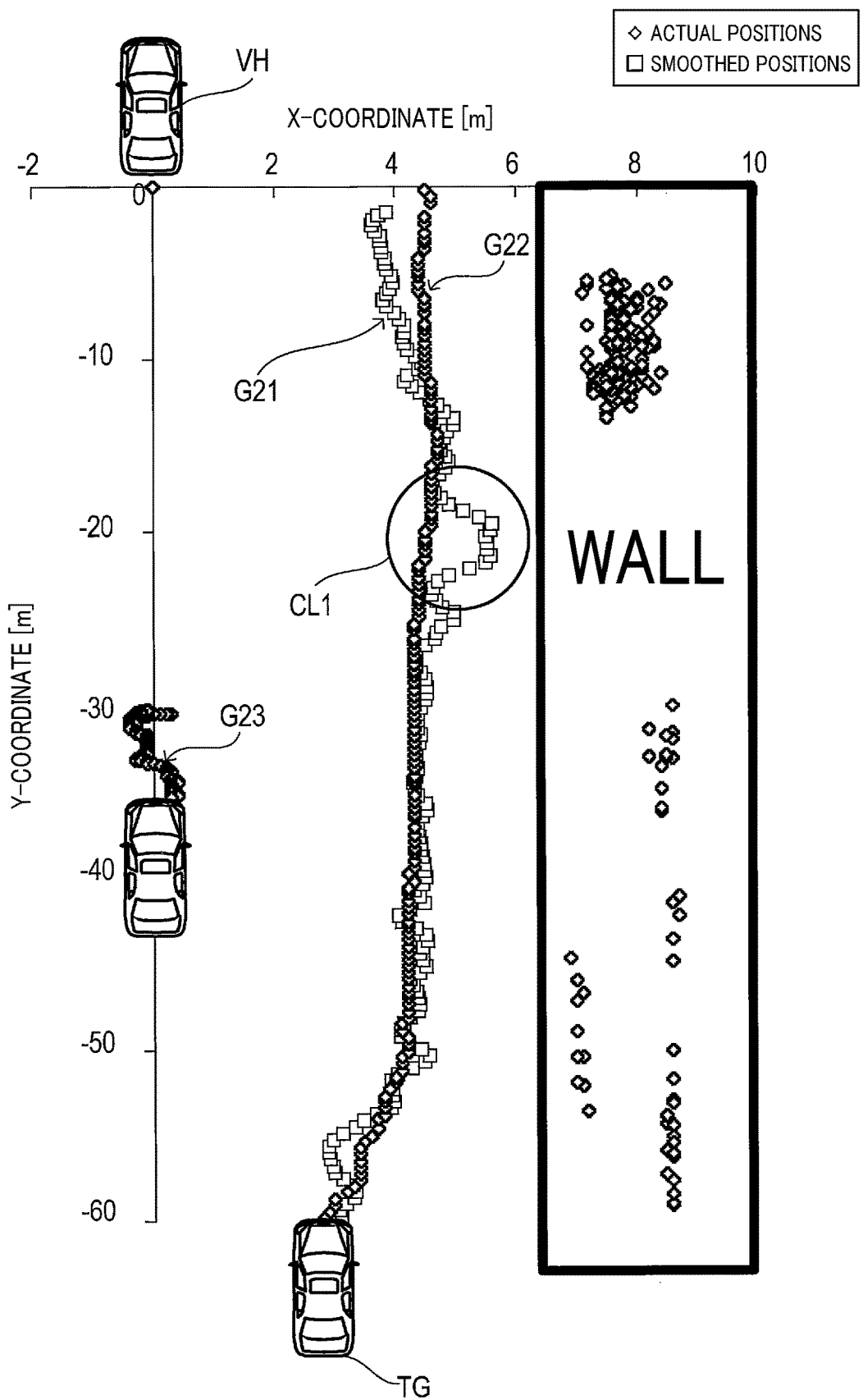
FIG. 9 is a diagram illustrating distortion of the trajectory of smoothed positions.

FIG. 9 shows the distribution of the actual positions and the smoothed positions in the case of detecting a moving object TG, which is approaching the vehicle VH from the right-rear side of the vehicle VH, without using the method of inhibiting the setting of the tracking filter coefficients α and β when the moving object is determined to be approaching the vehicle VH along an adjacent lane. The point group G21 in FIG. 9 represents the trajectory of the smoothed positions (i.e., the tracking trajectory). The point group G22 in FIG. 9 represents the trajectory of the actual positions of the moving object TG. In addition, the actual positions of the moving object TG are detected by a laser radar.

As shown in FIG. 9, the moving object TG is traveling on an adjacent lane that is adjacent to and rightward of the vehicle VH. Moreover, on the right side of the adjacent lane, there is installed a wall. Furthermore, there also exists a traveling vehicle that is located away from the vehicle backward by about 30 m on the lane where the vehicle VH is traveling. The point group G23 in FIG. 9 represents the trajectory of the actual positions of the traveling vehicle.

In the region enclosed by a circle CL1, under the influence of the wall existing on the right side of the moving object TG, variation occurs in the observed-point positions of the moving object TG, causing the trajectory of the smoothed positions to be distorted to the wall side. Consequently, though the moving object TG is actually approaching the vehicle VH along the adjacent lane on the right side of the vehicle VH, the moving object detection apparatus 4 erroneously determines that the moving object TG is moving away from the vehicle VH further rightward than the adjacent lane on the right side of the vehicle VH; thus the output of the warning sound is interrupted. The occurrence of such a situation is remarkable particularly when the relative speed between the vehicle VH and the moving object TG is low.

Figure 10:
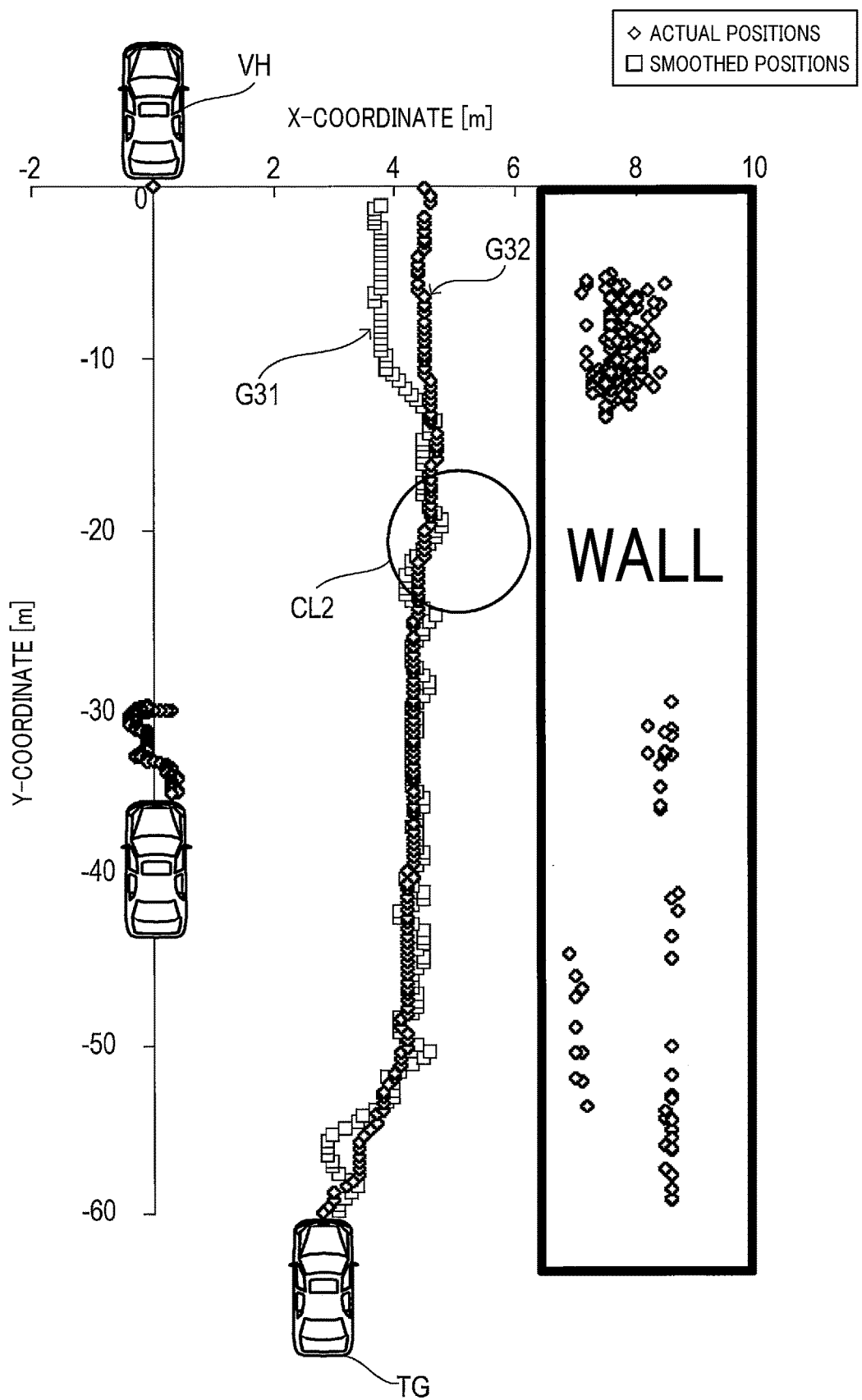
FIG. 10 is a diagram illustrating elimination of the distortion of the trajectory of smoothed positions.

In contrast, FIG. 10 shows the distribution of the actual positions and the smoothed positions in the case of detecting a moving object TG, which is approaching the vehicle VH from the right-rear side of the vehicle VH, using the method of inhibiting the setting of the tracking filter coefficients α and β when the moving object is determined to be approaching the vehicle VH along an adjacent lane that is adjacent to the vehicle VH. The point group G31 in FIG. 10 represents the trajectory of the smoothed positions (i.e., the tracking trajectory). The point group G32 in FIG. 10 represents the trajectory of the actual positions of the moving object TG.

As shown in FIG. 10, in the region enclosed by a circle CL2, the trajectory of the smoothed positions is not distorted to the wall side unlike in the region enclosed by the circle CL1 in FIG. 9. Consequently, the moving object detection apparatus 4 can suppress the occurrence of a situation where the output of the warning sound is interrupted though the moving object TG is actually approaching the vehicle VH along the adjacent lane on the right side of the vehicle VH.

In addition, the longer the distance from the moving object to the vehicle VH, the greater the variation in the observed-point positions due to variation in the detected azimuths. In this regard, the moving object detection apparatus 4 sets the tracking filter coefficients α and β so as to have a positive correlation between the distance from the moving object to the vehicle VH and the tracking filter coefficients α and β. Consequently, the moving object detection apparatus 4 can suppress deterioration in the responsiveness to the actual positions of the moving object in the tracking trajectory of the moving object even when the position of the moving object, which exists far away from the vehicle VH, rapidly changes.

The moving object detection apparatus 4 calculates, based on the estimated tracking trajectory, the predicted-point position Xp predicting the observed-point position to be indicated by the next-acquired observed-point information. Moreover, the moving object detection apparatus 4 sets the bias determination region that has its center at the predicted-point position Xp and the preset lateral length L3 in the width direction DW of the vehicle VH. Furthermore, when a plurality of the observed-point positions are continuously located outside the bias determination region, the moving object detection apparatus 4 determines that distribution of the plurality of the observed-points is biased. Consequently, it becomes possible for the moving object detection apparatus 4 to determine whether distribution of the plurality of the observed-points is biased by the simple method of determining whether the observed-point positions are within the bias determination region.

Moreover, the longer the traveling distance of the moving object, the larger the position change in the width direction DW of the vehicle VH when the moving object has changed its traveling direction by, for example, a lane change. Therefore, the moving object detection apparatus 4 sets the lateral length L3 so as to have a positive correlation between the distance from the smoothed position Xs(k) to the predicted-point position Xp(k+1) and the lateral length L3. Consequently, it becomes possible for the moving object detection apparatus 4 to suitably determine, according to the distance from the smoothed position Xs(k) to the predicted-point position Xp(k+1), whether distribution of the plurality of the observed-points is biased.

In the above-described embodiment, step S10 corresponds to a process performed by a position information acquisition unit; step S200 corresponds to a process performed by a trajectory estimation unit; steps S60-S110 correspond to a process performed by a bias determination unit; step S120 corresponds to a process performed by a filter setting unit; and step S50 corresponds to processes performed by an approach determination unit and an inhibition unit.

Moreover, the observed-point information corresponds to observed-point position information; the lateral distance Lt corresponds to the bias of the observed-point positions; the distance indicated by the observed-point information corresponds to the distance from the moving object to the vehicle; and the distance between the smoothed position Xs(k) and the predicted-point position Xp(k+1) corresponds to the distance from the current position of the moving object to the predicted-point position.

As above, one embodiment of the present disclosure has been described. However, the present disclosure is not limited to the above-described embodiment and can be carried out through various modifications.

For example, in the above-described embodiment, the radar apparatus 2 uses the FMCW method. However, the radar method of the radar apparatus 2 is not limited to the FMCW method. For example, the radar apparatus 2 may alternatively use a two-frequency CW method or an FCM method. In addition, FCM is an abbreviation of Fast-Chirp Modulation.

In the above-described embodiment, the radar apparatus 2 is configured to transmit radar waves to the right-rear side of the vehicle VH. However, the transmission direction of radar waves is not limited to the direction toward the right-rear side of the vehicle VH. For example, the radar apparatus 2 may alternatively be configured to transmit radar waves to at least one of a front side, a right-front side, a left-front side, a rear side, the right-rear side, a left-rear side, a right side and a left side of the vehicle VH.

Moreover, a function realized by a single component in the above-described embodiment may alternatively be realized by a plurality of components together. In contrast, functions realized by a plurality of components in the above-described embodiment may alternatively be realized by a single component. Furthermore, part of the configuration of the above-described embodiment may be omitted. In addition, the configuration of the above-described embodiment may be partially added to or partially replaced with the configuration of any other embodiment.

In addition to the above-described moving object detection apparatus 4, the present disclosure may also be embodied in various modes such as a system that includes the moving object detection apparatus 4 as a component thereof, a program for enabling a computer to function as the moving object detection apparatus 4, a storage medium having the program stored therein, and a method of detecting a moving object.

What is claimed is:

1. A moving object detection apparatus comprising:
   a position information acquisition unit configured to repeatedly acquire, from a radar apparatus that is mounted to a vehicle to transmit and receive radar waves, observed-point position information indicating observed-point positions that are positions of observed points where the radar waves are reflected;
   a trajectory estimation unit configured to estimate, based on the observed-point positions indicated by a plurality of pieces of the observed-point position information acquired by the position information acquisition unit respectively at different time instants and tracking filter coefficients indicating a degree of tracking the observed-point positions, a tracking trajectory tracking movement of a moving object corresponding to a plurality of the observed points;
   a bias determination unit configured to determine whether distribution of the plurality of the observed points on both sides of the tracking trajectory is continuously biased to one side of the tracking trajectory; and
   a filter setting unit configured to set the tracking filter coefficients so that the degree of tracking is higher when the distribution of the plurality of the observed points is determined by the bias determination unit to be biased than when the distribution of the plurality of the observed points is determined by the bias determination unit to be not biased.

2. The moving object detection apparatus as set forth in claim 1, wherein the filter setting unit is configured to set the tracking filter coefficients so as to have a positive correlation between the size of bias of the observed-point positions with respect to the tracking trajectory and the tracking filter coefficients.

3. The moving object detection apparatus as set forth in claim 1, further comprising:
   an approach determination unit configured to determine whether the moving object is approaching the vehicle along an adjacent lane that is adjacent to the vehicle; and
   an inhibition unit configured to inhibit, when the moving object is determined by the approach determination unit to be approaching the vehicle along the adjacent lane, the setting of the tracking fitter coefficients by the filter setting unit.

4. The moving object detection apparatus as set forth in claim 1, wherein the filter setting unit is configured to set the tracking filter coefficients so as to have a positive correlation between the distance from the moving object to the vehicle and the tracking filter coefficients.

5. The moving object detection apparatus as set forth in claim 1, wherein the trajectory estimation unit is configured to calculate, based on the estimated tracking trajectory, a predicted-point position predicting the observed-point position to be indicated by the observed-point position information to be acquired next by the position information acquisition unit;
   the bias determination unit is configured to:
   set a bias determination region that has its center at the predicted-point position and a preset lateral length in a width direction of the vehicle; and
   determine, when the positions of the plurality of the observed points are continuously located outside the bias determination region, that the distribution of the plurality of the observed points is biased.

6. The moving object detection apparatus as set forth in claim 5, wherein the bias determination unit is configured to set the lateral length so as to have a positive correlation between the distance from the current position of the moving object to the predicted-point position and the lateral length.

* * * * *